United States Patent Office 3,579,378
Patented May 18, 1971

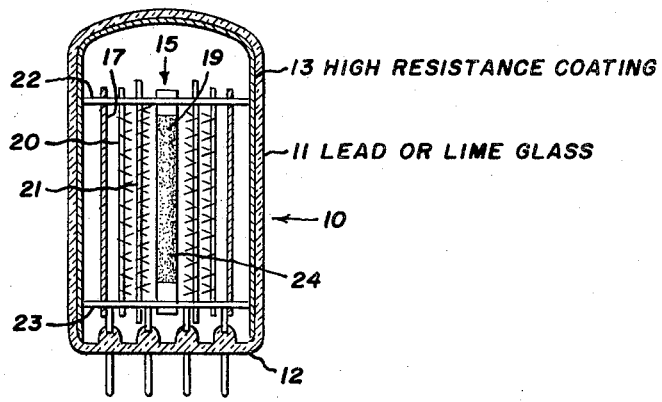
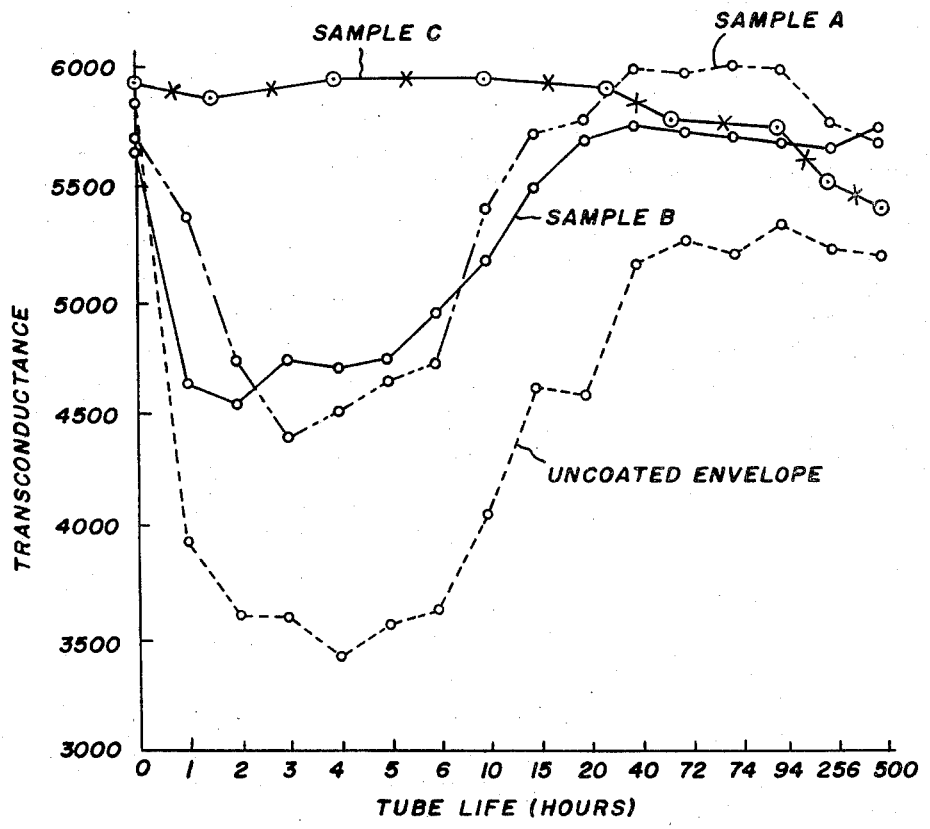

3,579,378
METHOD OF COATING AN ELECTRIC
DISCHARGE DEVICE
Walter T. Millis, Owensboro, Ky., assignor to
General Electric Company
Division of application Ser. No. 531,082, Mar. 2, 1966,
now Patent No. 3,465,196. Continuation-in-part of application Ser. No. 302,490, Aug. 9, 1963. This application Nov. 12, 1968, Ser. No. 798,830
Int. Cl. C23d 5/04
U.S. Cl. 117—229
1 Claim

ABSTRACT OF THE DISCLOSURE

A method of making an electric discharge device having a vitreous coating on the interior of the envelope is described. The vitreous coating inhibits the release of occluded gases from the envelope which upon release would adversely affect the operation and life of the device.

---

This is a division of my application Ser. No. 531,082, filed Mar. 2, 1966, now Pat. No. 3,465,196, entitled "Electric Discharge Device With Means to Prevent Release of Occluded Gases From the Envelope Thereof and Method"; and a continuation-in-part of application Ser. No. 302,490, filed Aug. 9, 1963, and now abandoned, and assigned to the same assignee as herein.

The present invention relates to electric discharge devices and more particularly to an improved electric discharge device with a vitreous envelope having an insulative coating on the interior thereof and to methods of preparing the same.

In electric discharge devices as heretofore known, the glass envelopes often used are prepared by melting the components of the glass composition in the presence of the flame used to provide heat. During the melting of the ingredients and the cooling of the resultant glass composition, combustion products such as water vapor, carbon monoxide, and carbon dioxide, are in contact with the surface of the molten glass and a relatively large percentage of the combustion products become oc-culuded in the resultant glass. When such glass has been formed into an envelope for an electrical device, the envelope is subject to heating and to bombardment by electrons whereupon the combustion products occluded therein are released by electrical dissociation. For example, in vacuum tubes, the released gases reduce the degree of vacuum within the envelope and cause deterioration of cathode electron activity. These products react with the constituents of the cathode coating such as barium, resulting in a lower initial cathode activity, and a gradual drop in cathode activity throughout the life of the tube or a decided drop in cathode activity early in its life with limited recovery thereafter.

This problem has long been recognized and many attempts have been previously made to avoid the release of occluded gases. For example, carbon or metallic films have been coated on the inside of glass envelopes and these have resulted in some improvement in the level and stability of cathode activity. However, in the case of carbon, the coating flakes off when the structure of the device is inserted into the envelope and such flakes, when present in the finished tube cause electrical "noise" and intermittent shorts, thereby rendering the device virtually inoperative. Metallic films, sometimes flashed onto the surface of the envelope during the evacuating process or subsequently thereto, are less likely to produce such loose particles. However, the flashing is very difficult to control and metal may deposit on insulating areas between elements of the device producing inter-element leakage, increasing inter-element capacitance or completely short circuiting the electrodes of the device.

The present invention is directed to an electric discharge device having a new and improved vitreous envelope wherein the release of occluded gases is prevented, without encountering the above-described problems.

It is, accordingly, an object of the present invention to provide a vitreous envelope for an electric discharge device wherein means are provided to prevent the release of gases occluded in the envelope walls.

A further object of the present invention is the provision of a vitreous envelope for an electric discharge device which is provided with a high-electrical resistance coating on its interior surface to prevent the release of occluded gases without increasing interelectrode capacitance. The use of a high-electrical resistance coating also limits the amount of current which can flow in the glass, which current can cause evolution of gases therefrom.

Another object of the present invention is the provision of a method of coating the interior surface of a vitreous envelope for electric discharge devices whereby the release of occluded gases is prevented.

A more specific object of the present invention is the provision of a method of preparing a coating for the interior surface of vitreous envelopes for electrical devices whereby the coating is formed without having gases occluded therein.

Other objects and advantages of the present invention will become apparent as the description and illustration thereof proceeds.

Briefly, in accordance with one form of the present invention, a vitreous coating is prepared by heating the constituents in an atmosphere free of combustion products or other gases susceptible of occlusion. The vitreous coating is then converted to powdered form and applied to the interior surface of a vitreous envelope, and a glaze or frit is formed over substantially all areas of the interior surface from which occluded gases might otherwise be released.

The electric discharge device is then completed by inserting a cage member including a cathode having an emissive coating thereon, evacuating, and sealing, the result being a device having an envelope with a barrier between occluded gases and the interior of the device. Alternatively, the entire envelope of the device may be prepared by heating in an atmosphere from which the combustion products of the heating means are excluded so that no occluded gases are present in the envelope and the construction of the device proceeds without coating the interior surface.

The novel features believed characteristic of the invention are set forth in the appended claims. The invention itself together with further objects and advantages thereof may best be understood by reference to the following description taken in connection with the appended drawing in which FIG. 1 is a longitudinal cross sectional view of an electric discharge device constructed in accordance with my invention; and FIG. 2 is a graph wherein data taken from vacuum tubes both with and without the coating of the present invention are compared.

As shown in FIG. 1, an electric discharge device, according to the present invention, comprises a vitreous envelope, which includes a tubular member 11 which may be cylindrical, as shown, or may be of any other suitable geometrical configuration, and, as will appear, is fabricated of lead or lime glass as desired or required. The envelope 10 is completed by a stem or base portion 12 which closes the open end of the member 11. The major portion of the internal surface of the member 11 is coated with a tightly adhering layer of glaze 13 of high-electrical resistance material which functions to entrap, or seal off, any gases or vapors that may be adhering to or occluded in the walls of the member 11.

The electric discharge device further includes a cage member 15 which may be of any suitable electrical configuration such as a rectifier, triode, pentode, etc. As depicted, the cage member includes a tubular anode 17, a tubular cathode 19 and wound grids 20 and 21 supported between a pair of insulating supports 22 and 23, thereby providing a tetrode structure. The cathode 19 is provided with an electron emissive coating 24 of, for example, barium oxide which emits electrons when heated by a heater filament (not shown) normally provided within the cathode.

The method and envelope of the present invention are best described in three parts: First, the method of preparing a coating; second, the method of applying a coating; and third, the method of manufacture of the electric discharge device.

In preparing a vitreous coating according to one aspect of the present invention, one can place either a prepared composition having the desired ingredients or the separate ingredients themselves in an enclosed furnace having an external heating means. Although the composition of the coating is not critical to the present invention, the following considerations are important. First, the coefficient of expansion of the coating should be adequately matched with that of the vitreous envelope so that the coating will not break away from the envelope or cause cracking of the envelope. Secondly, the melting point of the coating should be lower than that of the envelope so that the coating can be glazed over the interior surface, as will be hereinafter described, without melting the envelope. Both of these factors are controlled by the composition of the coating and, therefore, it is of practical importance to select appropriate ingredients. For example, it has been found that coatings comprising from about 60% to about 80% lead monoxide are appropriate for use in conjunction with lime glass which is the most common material presently used for vitreous envelopes of electrical devices. It has also been found that glasses containing approximately 50% silica are also appropriate.

As an added precaution, and to further ensure removal of water vapor, one may heat the mixture in vacuo to a temperature appropriate to remove such occluded water vapor and thereafter providing a dry air atmosphere in the furnace and continuing the heating to the melting point of the ingredients or of the composition. If the initial heating is not performed in a vacuum it has been found that the pressure of the atmosphere may not permit removal of all of the water vapor in the mixture. If the vacuum is maintained throughout the heating process, some components of the coating would be released as vapors, thus changing the composition of the coating. However, it is contemplated, according to the present invention, to employ both vacuum and air heating throughout since either procedure will result in the exclusion of substantially all of the combustion product gases and this will provide the benefits of this method of preparation.

An important feature of the present invention is embodied in the above-described preparation of the coating, namely, that the coating can be prepared in such a manner as to exclude therefrom combustion products of the flame heretofore used to melt glasses used for vitreous envelopes. The absence of these gases enables operation of the tube made with an envelope according to this invention at higher levels and for longer periods because the gases cannot be released to cause the difficulties previously described.

The method of applying the coating to the interior surface of the vitreous envelope will now be described. The material which will form the coating is ground into a fine powder and is mixed with an appropriate suspension medium such as alcohol or ethanol, which function to hold the powder on the surface of the envelope while the glazing is performed. The mixture containing the powdered coating material is poured into the interior of the vitreous envelope so as to cover all desired areas of the interior surface and excess solution is removed as by pouring off. The coated envelope is then heated to any suitable temperature above the melting point of the coating material and below that of the envelope material and preferable to the annealing temperature of the latter, to remove the binder by drying and to glaze the powder to the interior surface of the envelope. The glazing may thus be performed at the same time as the annealing of the envelope.

As specific examples of the vitreous coatings used, glasses having the following compositions were found to be appropriate for use with lime or lead glass envelopes and, when prepared in accordance with the above-described steps, the electrical device life and cathode activity were greatly increased:

|  | Percent | |
|---|---|---|
|  | Sample A | Sample B |
| Lead oxide | 80 | 70 |
| Alumina | 5 | 0 |
| Silica | 5 | 9 |
| Boric oxide | 10 | 13 |
| Potassium oxide | 0 | 8 |

The above vitreous coatings were prepared in accordance with the preferred embodiment of the invention, by placing a prepared glass having the appropriate composition in an enclosed furnace having external heating means. The material is then heated in vacuo to a temperature appropriate to remove occluded water vapor. A dry air atmosphere is then introduced into the system and the heating continued to the melting point of the glass to remove occluded gases and provide a vitreous coating material substantially free of all of combustion products. This material is then ground to a fine powder and mixed with alcohol to form a suspension. This suspension is poured into the interior of the vitreous envelope of the discharge device and the excess poured off after the desired areas have been covered by the suspension. The envelope covered with the suspension is then heated to a temperature above the melting point of the coating material and below that of the envelope to glaze the powder to the interior of the envelope.

A cage member 15 including a cathode 19 having an emissive coating 24 thereon is secured upon a base member 12. The assembled cage and base are juxtapositioned with the envelope 10 with the cage in the position depicted in FIG. 1.

The base member 12 is then sealed to the bottom of the tubular member 11 to complete the envelope and enclose the cage member 15. The electric discharge device is completed by exhausting the envelope through an exhaust tubulation (now shown), the exhaust tubulation then being sealed off.

The resultant article comprises the vitreous envelope 11 having a coating 13 on the interior surface thereof, as shown in FIG. 1. The coating is a glaze which covers all areas of the interior surface which may be exposed to the evacuated region of the electrical device so that occluded gases in the vitreous envelope cannot be released to the evacuated area by operational heating or by electron bombardment. The coating itself is prepared so that it is free of such occluded gases and, therefore, the evacuated space will remain free of such occluded gases throughout the life of the device.

The graph of FIG. 2 illustrates the advantages gained in vacuum tube cathode activity resulting from coating the envelope in accordance with this aspect of the present invention. The graph is a plot of an emission factor or of the cathode or transconductance of the device during the life of the device for three otherwise identical vacuum tube devices. It will be noted that the hours of life scale is not linear, the points being plotted at regular intervals regardless of the actual intervals between measurements. Since the purpose of this graph is to indicate the relative operation with and without envelope coating, the distance between plotted measurements are not important so long as they are the same for each tube. The actual hours between measurements are indicated by the abscissas.

It will be seen from this graph that tubes coated with Samples A and B maintained a much higher transconductance throughout their usable life than did the uncoated tube. The higher level of cathode activity, indicated by the higher transconductance, contributes significantly to improve tube operation. Furthermore, since the coating is insulative rather than conductive, there is no problem of undesirably changing the inter-element capacitance nor of short circuiting the elements, as has been experienced with conductive coatings. The insulative glaze of the invention has been found to be highly adherent to the vitreous envelope and there is no problem of flaking of particles on insertion of the tube elements which may cause electrical noise of interference. Since the coating is performed before insertion of the elements, the locating of the coating can be carefully controlled as desired without encountering the difficulty of positioning a flashed coating or other coating applied after the completion of the tube or device.

In the tubes actually used for these measurements illustrated, only 75% of the interior was coated for convenience. In practice, the entire inner surface exposed to the tube elements may be coated as far as necessary to result in further improvement due to the exclusion of occluded gases from the electron bombarded portions of the envelope.

An alternative method of preparing an electrical device envelope having a vitreous coating is provided by my invention by using a silicone resin dissolved in a volatile solvent such as naphta or toluene. Silicone resins, for example, a methyl methoxypolysiloxane made by the process of Example 1 of U.S. Pat. No. 2,810,704, of Karl W. Krantz, patented Oct. 22, 1957 and assigned to the assignee of this application, has been found to be a satisfactory coating preparation when diluted to a 5% solid concentration with petroleum spirits. The solution is poured into the envelope, the excess is poured off and the adhering portion is dried. The envelope is fired, for example during annealing, at a temperature such as 400° C.–450° C. During firing, the resin breaks down chemically to form a vitreous coating or glaze which comprises silicon monoxide and silicon dioxide. This vitreous coating performs the same function as the coatings described hereinabove, namely, to prevent the release of occluded gases. The resultant coatings in each case are vitreous and are good electrical insulators.

A further method of obtaining electric discharge devices having improved transconductance characteristics is provided by my invention by using an amorphous silica which is essentially pure $SiO_2$ in a non-crystalline form. Such material is obtained as a by-product, actually a waste product, in the production of silicon metal. During such production a certain amount of silicon vaporizes and is carried through the air circulation system. To prevent discharge of this waste into the atmosphere, it is collected in the form of the aforementioned amorphous quartz. Such material has been found to be highly suitable for the manufacture of electric discharge devices in accordance with the invention, not only because of economy, but also because of ease in processing. Because of the nature of the material, i.e., its lack of crystallinity and its small particle size, it has been found to readily adhere to the interior of the envelope without firing, however, firing improves the adherence further, and being a stable compound will not decompose and add contaminants to the tube during operation thereof. This material has a chemical analysis of:

| Sample C: | Percent |
|---|---|
| $Fe_2O_3$ | .34 |
| $MnO$ | .09 |
| $Al_2O_3$ | .21 |
| $CaO$ | .35 |
| $MgO$ | .23 |
| $K_2O$ | .59 |
| $Na_2O$ | .07 |
| $SO_3$ | .35 |
| $C+H_2O+CO_2$ | 1.68 |
| $SiO_2$ | Balance |

Thus, in accordance with this aspect of the invention, a quantity of Sample C amorphous silica having a grain size between approximately .25 and .02 micron was mixed with methanol to form a thin slurry. The mathanol was used since it evaporates readily without leaving a hydrocarbon residue. This slurry was poured into a tubular member 11 and the excess poured out leaving a film of the slurry on the interior walls thereof. The methanol readily evaporates leaving an essentially pure $SiO_2$ vitreous coating on the envelope. The evaporation of methanol may be conveniently speeded up by heating to approximately 100° C. This coating is very adherent and does not flake off on shaking or other handling of the bulb.

Before sealing this tubular member with an assembled cage and base member a portion of the interior wall adjacent the areas to be sealed to the base is wiped clean. The tube is completed in the same manner as above.

As shown in the graph of FIG. 3, the curve for Sample C illustrates again the advantages gained in electric discharge devices resulting from coating the envelope in accordance with this further aspect of the invention. It will be noted that Sample C, the amorphous silica, in this case, does not exhibit the initial slump exhibited by Samples A and B and to a larger extent the uncoated envelope.

While the latter examples have been disclosed as being placed on the envelope by a pouring method it will be appreciated that painting, spraying or other convenient coating technique may be employed. Also, while the improvement of the transconductance characteristic of the tube has been specifically disclosed, it will be appreciated that the invention will be useful for maintaining other electrical characteristics of the tube, as for example, interelectrode capacitance.

It is to be noted that the entire envelope material could, if desired, be made from a composition free of occluded gases, thus obviating the need for the coating for entrapment of such gases. However, in view of the mass production of vitreous envelopes for electrical devices, and the practicality of flame-melting large quantities of glass to be used for this purpose, the more economical method is to apply the coating of this invention to the interior of an envelope.

The specific embodiments, methods and compositions described herein are presented merely as examples of the many forms the practice of this invention may take. Therefore, it is intended in the appended claim to cover all modifications and variations which come within the true spirit and scope of the invention.

What I claim as new and desire to secure by Letters Patent of the United States is:

1. A method of improving the transconductance of an electric discharge device including a coated cathode in a vitreous envelope by preventing discharge of occluded gases from said envelope to the interior of said device during operation comprising the steps of:

(a) coating the interior of said envelope with an insulative coating of lead glass, said glass being prepared by heating the components thereof in a vacuum until water vapor therein has been removed and thereafter providing a dry air atmosphere, said coating composition being substantially free of occluded gases;

(b) heating said components in said dry air atmosphere to the melting point thereof to form a vitreous composition; and (c) sealing a cage member of said discharge device in said envelope.

References Cited

UNITED STATES PATENTS

| 2,726,172 | 12/1955 | Bennett et al. | 117—97X |
| 2,744,034 | 5/1956 | Dalton et al. | 117—97 |
| 2,810,660 | 10/1957 | Carpenter | 117—97X |

WILLIAM L. JARVIS, Primary Examiner

U.S. Cl. X.R.

117—97; 313—223,197; 65—60